United States Patent
Jiang et al.

(10) Patent No.: US 10,565,255 B2
(45) Date of Patent: Feb. 18, 2020

(54) METHOD AND SYSTEM FOR SELECTING IMAGES BASED ON USER CONTEXTUAL INFORMATION IN RESPONSE TO SEARCH QUERIES

(71) Applicant: Baidu USA LLC, Sunnyvale, CA (US)

(72) Inventors: Yifei Jiang, Sunnyvale, CA (US); Zhuang Li, Sunnyvale, CA (US); Dong Li, Sunnyvale, CA (US); Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 474 days.

(21) Appl. No.: 15/246,383

(22) Filed: Aug. 24, 2016

(65) Prior Publication Data

US 2018/0060358 A1    Mar. 1, 2018

(51) Int. Cl.
*G06F 17/30* (2006.01)
*G06F 16/58* (2019.01)
*G06F 16/248* (2019.01)
*G06F 16/9535* (2019.01)
*G06F 16/2457* (2019.01)

(52) U.S. Cl.
CPC ........ *G06F 16/5866* (2019.01); *G06F 16/248* (2019.01); *G06F 16/24578* (2019.01); *G06F 16/9535* (2019.01)

(58) Field of Classification Search
CPC ........... G06F 17/30268; G06F 16/5866; G06F 16/9535; G06F 16/24578; G06F 16/248
See application file for complete search history.

(56) References Cited

U.S. PATENT DOCUMENTS

| | | | |
|---|---|---|---|
| 6,834,371 B1* | 12/2004 | Jensen | G06F 17/30017 707/E17.009 |
| 2006/0041591 A1* | 2/2006 | Rhoads | G06F 16/48 |
| 2007/0064121 A1* | 3/2007 | Issa | G06Q 30/02 348/231.2 |
| 2008/0133505 A1* | 6/2008 | Bayley | G06F 17/30716 |
| 2009/0161960 A1* | 6/2009 | Takizawa | G06F 17/3028 382/190 |
| 2009/0199230 A1* | 8/2009 | Kumar | G06Q 30/02 725/32 |

(Continued)

*Primary Examiner* — Syed H Hasan
(74) *Attorney, Agent, or Firm* — Womble Bond Dickinson (US) LLP

(57) ABSTRACT

According to one embodiment, a content item is received that was searched and identified based on a first set of one or more keywords determined based on a search query received from a client device over a network. A search is performed in an image store to identify a plurality of images based on the first set of keywords and a second set of one or more keywords associated with the content item. The images are ranked based on a user context obtained at a time when the search query was received. A composite content item is generated by incorporating an image selected from the ranked images with the content item, where the selected image is ranked above a predetermined threshold. The composite content item is transmitted to the client device over the network.

21 Claims, 10 Drawing Sheets

(56) References Cited

U.S. PATENT DOCUMENTS

| | | | |
|---|---|---|---|
| 2010/0125568 A1* | 5/2010 | van Zwol | G06F 16/583 707/722 |
| 2011/0072048 A1* | 3/2011 | Hua | G06F 17/30265 707/780 |
| 2011/0264641 A1* | 10/2011 | Yang | G06F 17/3028 707/706 |
| 2011/0270828 A1* | 11/2011 | Varma | G06F 17/30864 707/728 |
| 2012/0323901 A1* | 12/2012 | Masuko | G06F 17/30253 707/723 |
| 2013/0346077 A1* | 12/2013 | Mengibar | G10L 15/265 704/235 |
| 2014/0012878 A1* | 1/2014 | Moussavian | G06Q 50/20 707/776 |
| 2014/0181096 A1* | 6/2014 | Zhuang | G06F 17/30663 707/727 |
| 2015/0070516 A1* | 3/2015 | Shoemake | H04N 21/42203 348/207.11 |
| 2015/0287080 A1* | 10/2015 | Geetha | G06Q 30/0256 705/14.54 |
| 2015/0324392 A1* | 11/2015 | Becker | G06F 17/30554 707/706 |
| 2016/0035055 A1* | 2/2016 | Perkins | G06F 21/10 705/310 |
| 2016/0179969 A1* | 6/2016 | Greathouse | G06F 17/30867 707/710 |
| 2016/0380828 A1* | 12/2016 | Mulligan | H04L 67/10 709/223 |
| 2017/0185670 A1* | 6/2017 | Dua | G06F 17/241 |
| 2018/0011854 A1* | 1/2018 | Yi | G06N 99/005 |
| 2018/0060357 A1* | 3/2018 | Jiang | G06F 17/218 |

* cited by examiner

300

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

FIG. 3

METHOD AND SYSTEM FOR SELECTING IMAGES BASED ON USER CONTEXTUAL INFORMATION IN RESPONSE TO SEARCH QUERIES

FIELD OF THE INVENTION

Embodiments of the present invention relate generally to searching content. More particularly, embodiments of the invention relate to ranking and selecting images based on user contextual information in response to search queries.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. There has been a lack of efficient ways to rank images for matching content items.

BRIEF DESCRIPTION OF THE DRAWINGS

Embodiments of the invention are illustrated by way of example and not limitation in the figures of the accompanying drawings in which like references indicate similar elements.

FIG. 3 is an example of a keyword-image matching table according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when ranking and selecting an image to be matched with a content item (e.g., as a background image or complementing image), user contextual information of a user who initiated the original search query may be utilized to select one of the images. The user contextual information is determined or received at the time the search query was received. The user contextual information may include a geographic location of a user device of the user, user activities at the point in time, and date and time when the search query was issued. The user context may affect the user's preference or the image's appealing to the user. By taking user context into the consideration when selecting an image, the image, as well as the matched content item, is more appealing to a user.

In one embodiment, in response to a search query received from a client device of a user over a network, a search is performed in a content database based on a first set of one or more keywords associated with the search query. A content item is identified and retrieved from the content database. A search is performed in an image store to identify a list of images as image candidates based on the first set of keywords and a second set of keywords associated with the content item. The images are sorted and ranked based on a user context obtained at the time when the search query was received. The user context may be collected by the client device and transmitted from the client device along with the search query. An image that is ranked above a predetermined threshold is selected. A composite content item is generated by incorporating the selected image and the content item. The composite content item is then transmitted to the client device over a network to be presented to the user therein.

Figure 1A:
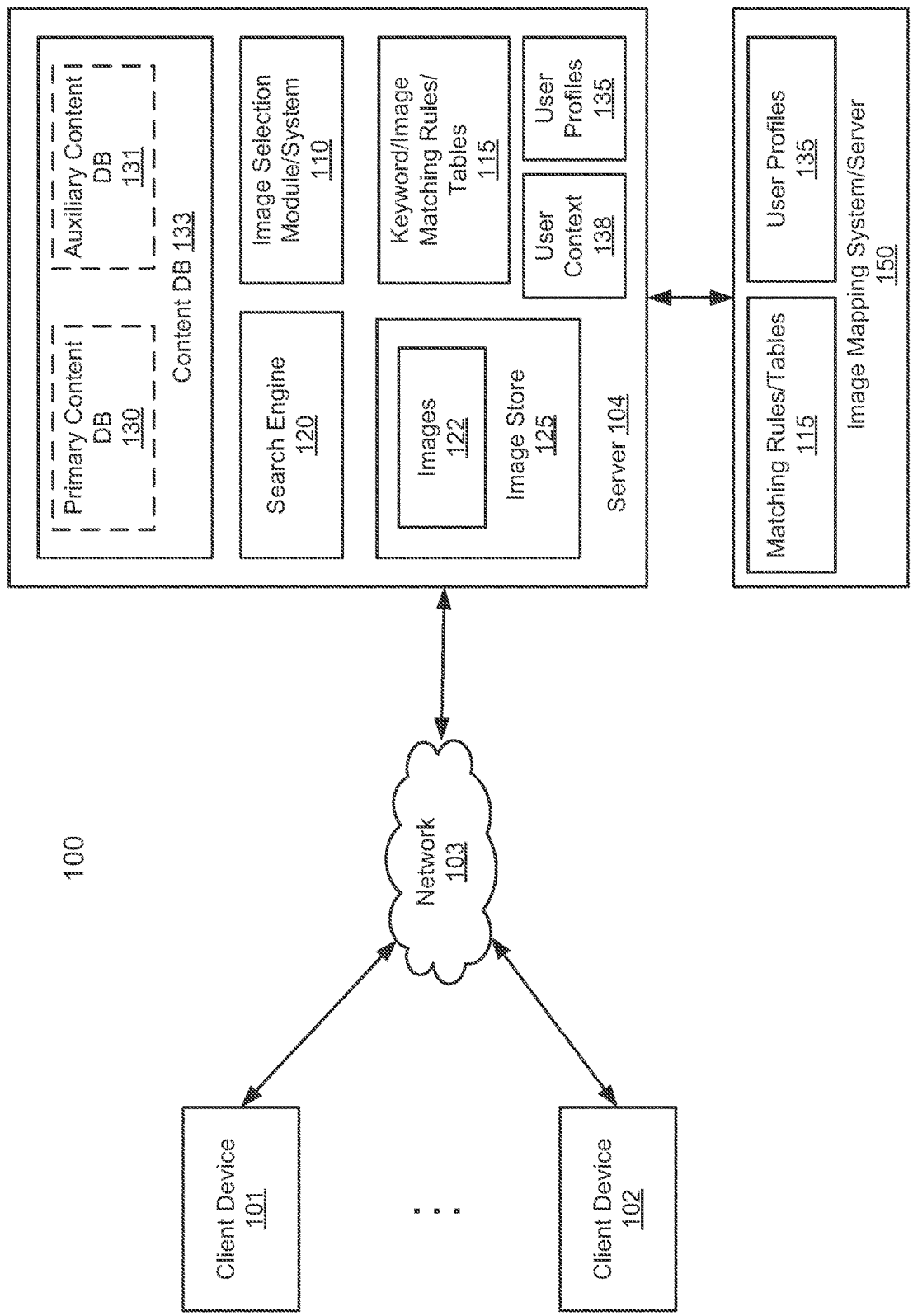
FIGS. 1A and 1B are block diagrams illustrating an example of system configuration for matching images with content items according to some embodiments of the invention.
Figure 1B:
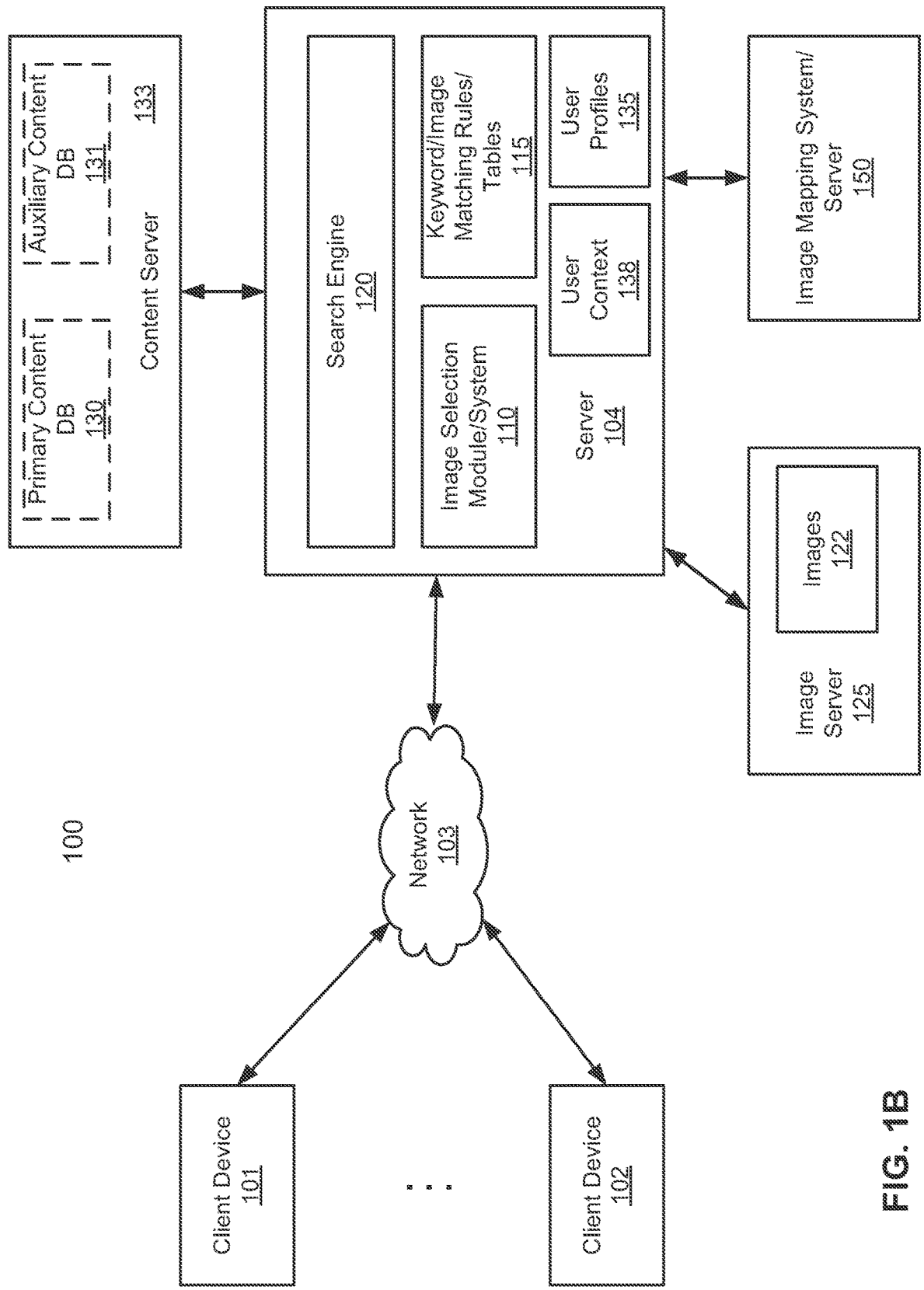

FIGS. 1A and 1B are block diagrams illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and keyword/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a client application of client device 101 (e.g., Web browser, mobile application), may send a search query to server 104 and the search query is received by search engine 120 via an interface over network 103. The search query may be received via a variety of communication protocols such as a transport control protocol and Internet protocol (TCP/IP) protocol. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords.

Primary content database 130 (also referred to as a master content database) may be a general content database, while auxiliary content database 131 (also referred to as a secondary or accessory content database) may be a special or sponsored content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called a proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). Alternatively, some of the content items may be sponsored content items provided and sponsored by a variety of content providers as sponsors. In one embodiment, primary content database 130 stores general content items that have been collected by network crawlers (e.g., unsponsored content).

Auxiliary content database 131 stores specific, special, or sponsored content items (e.g., advertisements or Ads) that are associated with specific, known, or predetermined content providers (e.g., advertisers). In one embodiment, in response to a search query, a first set of keywords is determined based on the search query, where the keywords include search terms specified in the search query and keywords semantically related to the search terms. The first set of keywords are then matched with another set or sets of keywords (e.g., bidwords) associated with one or more content providers. If there is a match, a corresponding content item or items are identified and retrieved from auxiliary content database 131. There may be a query keyword to content provider keyword matching data structure or table (not shown) for matching purposes.

Keyword/image matching rules/tables 115 (also referred to as an image index) includes a number of mapping entries, each mapping entry mapping one or more keywords to one or more image IDs identifying one or more images. Keyword/image matching rules/tables 115 may be implemented in a variety of data structures such as a table or database. Based on the image IDs, a list of image candidates can be identified and retrieved from images 122 stored in image store 125, where image store 125 may also store image metadata (not shown) describing images 122. In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images.

According to one embodiment, keyword/image mapping rules 115 may be previously compiled and generated prior to receiving the search query (e.g., offline). The set of keyword/image matching rules 115 is configured to map one or more keywords to one or more image IDs identifying one or more images. The keywords may be identified as the keywords that are more likely be used in search queries, keywords associated with certain content items, and/or keywords associated with certain content providers. Such keywords may be identified based on an analysis or tracking of user searching activities or search history, which may be compiled for a period of time and compiled as a part of user profiles 135.

Subsequently when a search query is received online by search engine 120 from a client device for searching content, a search is performed in content database 133 to retrieve a list of content items. In addition, for at least one of the content items, an analysis is performed, for example, by image selection module 110, on the search query, the content item, and/or a content provider providing the content item, to determine a set of keywords. The keywords may include one or more keywords associated with the search query (e.g., search terms), one or more keywords associated with the content item (e.g., obtained from a title and/or description of the content item), and/or one or more keywords (e.g., bidwords) associated with the content provider providing the content item. The keywords may further include certain keywords that are semantically similar or have the same meaning of the original keywords (e.g., synonymous words or phrases). Based on the keywords, a list of one or more images are identified from image store 125 using the set of keyword/image matching rules 115.

According to one embodiment, the identified images may be ranked by image selection module 110, using a variety of ranking algorithms or ranking models, which have been generated and configured by image mapping system 150. For at least one of the content items found in content database 133, an image is selected from the list of image candidates to be associated with the content item. The selected image may be incorporated with the content item to generate an incorporated or composite content item. For example, the selected image may serve as a background image to the content item or alternatively, the selected image may be positioned complementing or alongside the content item. The list of incorporated content items and images is returned to client device 101 as part of a search result.

According to one embodiment, when ranking and selecting an image to be matched with a content item (e.g., as a background image or complementing image), user contextual information 138 of a user who initiated the original search query may be utilized to select one of the images. The user contextual information 138, simply referred to as a user context, may be automatically determined or received at the time the search query was received (e.g., during a current communication session). For example, the user context 138 may be collected by a client application running within a client device (e.g., a mobile application of a mobile device). The user context 138 may also be determined based on a user interaction history of the user, which may be compiled as a part of user profiles 135 by image mapping system/server as a data analytics system. The user profile 135 of the user may be updated based on the current user context 138. User profile 135 contains more stable properties associated with user, e.g., user's interests, while user context 138 is independent and objective information to user, and may change from time to time, e.g., location.

In one embodiment, the user context 138 may include a geographic location of a user device of the user, user activities at the point in time, and date and time when the search query was issued. The user context 138 may affect the user's preference or the image's appealing to the user. For example, when a user stays at home, the user may find peaceful images more attractive than other disorderly images. When a user is shopping, the user may be more sensitive for images with certain features such as sales or promotion content. During a particular day such as a holiday, a user may prefer certain colors such as red and white, etc. Therefore, by taking user context into consideration when selecting an image, the image, as well as the matched content item, will be more appealing or attractive to a user.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Image mapping system 150 may also be implemented as a separate server, which is responsible for creating keyword/image mapping rules or tables 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) may be matched with the images obtained from image store/server 125, while content items obtained from primary content database 130 (e.g., general content) may be returned to the client device without modification as part of the search result.

Figure 2:
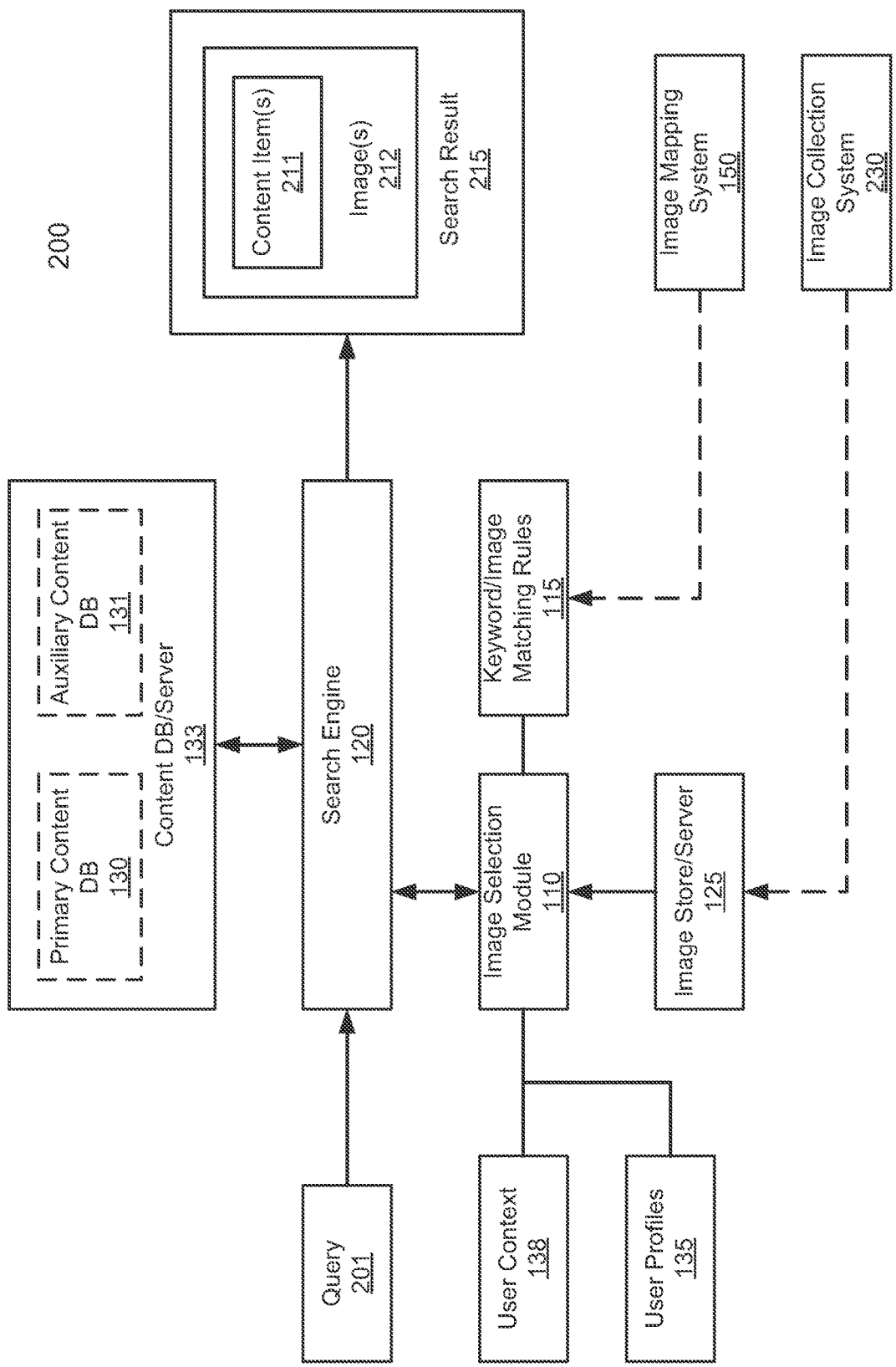
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords or search terms associated with search query 201. In addition, for at least one of the content items, search engine 120 communicates with image selection module 110 to identify a list of images from image store or image sever 125 based on the keywords associated with search query 201 and/or the content item and its content provider using a set of keyword/image matching rules 115. Search engine 120 and/or image selection module 110 may perform an analysis on the search query and the content item/content provider to derive a list of keywords. The searches performed in content database/server 133 and/or image store/server 125 may be performed on the list of expanded keywords expanded from the original keywords based on an analysis (e.g., a latent semantic analysis).

In one embodiment, image selection module 110 and/or keyword/image matching rules 115 may be integrated with search engine 120. Keyword/image matching rules 115 may be previously configured or compiled, for example, by image mapping system 150 as a data analytics system. Image mapping system 150 may be hosted in a separate system or server communicatively coupled to system 200 via an API or over a network. Image mapping system 200 may include a user interface to allow a user or an administrator to configure a set of keyword/image matching rules, which may then be expanded and ranked using a predetermined algorithm by processing logic.

Similarly, images stored in image store/server 125 may be collected by image collection system 230, which may be a separate system or server communicatively coupled to system 200 over a network. Image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215. Note that some or all of the components or modules as shown in FIG. 2 may be implemented in software, hardware, or a combination thereof.

According to one embodiment, when selecting an image to be associated with a content item, image selection module 110 takes user context information, in this example, user profile 135 of a user, into consideration. In response to search query 201 received from a client device of a user over a network, a search is performed by search engine 120 in content database 133 based on a first set of one or more keywords associated with search query 201. A content item is identified and retrieved from the content database. A search is performed by image selection module 110 in image store 125 to identify a list of images as image candidates based on the first set of keywords associated with search query 201 and a second set of keywords associated with the content item. The images are sorted and ranked based on user context 138 and/or user profiles 135 obtained at a time when the search query was received and prior user interactions. The user context 138 may be collected by the client device and transmitted from the client device along with the search query. An image that is ranked above a predetermined threshold is selected. A composite content item is generated by incorporating the selected image and the content item. The composite content item is then transmitted to the client device over a network to be presented to the user therein.

FIG. 3 is an example of keyword-image matching tables according to one embodiment of the invention. Referring to FIG. 3, keyword/image matching table 300 may represent keyword/image matching rules 115 of FIGS. 1A-1B and 2 as described above. In one embodiment, keyword/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Figure 4:
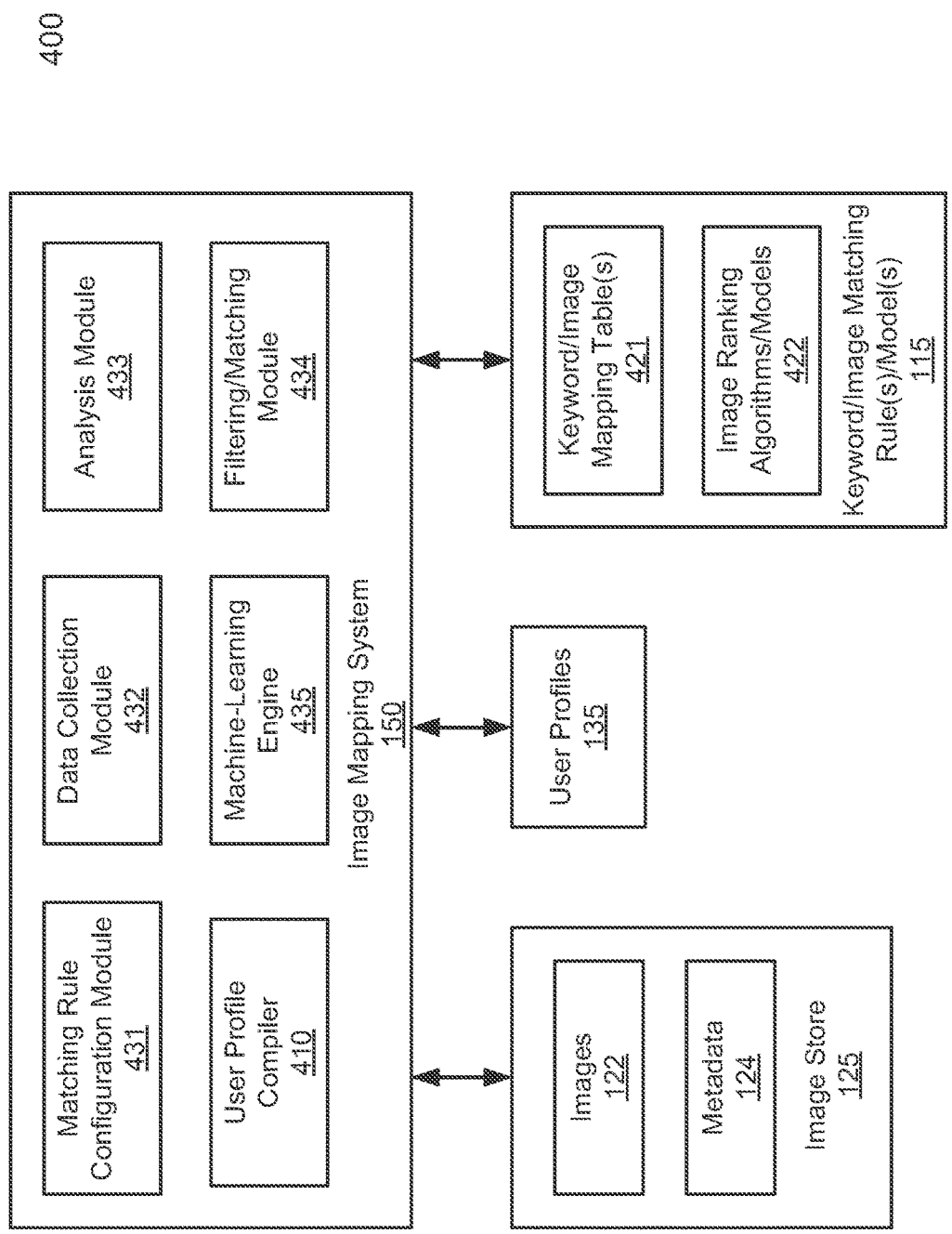
FIG. 4 is a block diagram illustrating an image mapping system according to one embodiment of the invention.

FIG. 4 is a block diagram illustrating an image mapping system according to one embodiment of the invention. System 400 may be implemented as part of system or sever 150 of FIGS. 1A-1B. Referring to FIG. 4, system 400 includes, but is not limited to, keyword/image mapping system 150, image store 125, and keyword/image matching rules 115. In one embodiment, system 400 is utilized to configure and generate a set of keyword/image matching rules 115 to map certain keywords to images stored in image store 125.

Image store 125 may be maintained locally or remotely in a designated server over a network. The keywords utilized in mapping in keyword/image matching rules 115 may be the keywords that are more likely used in search queries. Image store 125 stores images 122 and their respective metadata 124. Keyword/image matching rules 115 include keyword/image mapping tables 421 and image ranking algorithms or models 422. Keyword/image mapping tables 421 may be implemented as any of mapping tables as shown in FIG. 3.

In one embodiment, image mapping system 150 includes matching rule configuration module 431, data collection module 432, analysis module 433, matching module 434, and machine-learning engine or training module 435. Modules 431-435 may be implemented in software, hardware, or a combination thereof. In one embodiment, configuration module 431 may be utilized to configure keyword/image mapping table 421, for example, in response to a user request via a user interface. Keyword/image mapping table 421 includes a number of mapping entries. Each mapping entry maps a keyword to one or more image IDs identifying one or more of images 122 stored in image store 125. Images 122 and metadata 124 may be periodically collected and updated by data collection module 432. Data collection module 432 may employ some Web crawlers to craw and collect the images and their surrounding information or metadata 124.

In one embodiment, metadata 124 includes a variety of information or data describing images 122, where metadata may be obtained or collected by a designated data collection module or system, such as data collection module 432. For example, image metadata may be collected at the time of a corresponding image is obtained. The image metadata may include a source from which the image is collected and a time of the collection. A source from which an image is obtained may be a Web page or a document in which the image is attached. An address such as a universal resource locator (URL) of the source page may be collected. In addition, an analysis may be performed on the content of the source page to determine the content possibly represented by the image.

An image recognition may also be performed on the image to determine the content of the image (e.g., whether the image is about a person, an object, landscape, texts, or a combination thereof). In addition, attributes of the image, such as an aspect ratio, pixel counts, brightness, contrast, time of the image taken, and style (e.g., landscape vs. portrait, size of the image), may also be collected. Further, prior user interactions with the image and/or keyword in the past (e.g., a click through rate) may also be determined based on the history interactions associated with the image. These information may be compiled as part of metadata of the images 124, also referred to as features of the images for the purpose of scoring.

Based on the metadata, filtering and matching module 434 performs a filtering operation to determine whether a particular keyword sufficiently describing the image by matching the semantic meanings between the keyword and the metadata of a particular image. For example, if a keyword appears in a source page from which the image was collected, the keyword is related to the image. Similarly, if a keyword describes at least a portion of content of the image in response to an image recognition, the keyword may be related.

If it is determined that a keyword does not sufficiently describes a particular image or vice versa based on the analysis on the metadata, that particular image may be removed. If it is determined that the prior user interactions with a particular image is below a predetermined threshold (e.g., fewer user interactions, less user interest or unpopular), that particular image may be removed from keyword/image mapping table 421. Note that throughout this application, the terms of "matching rule," "mapping rule," "matching table," and "mapping table" are interchangeable terms for the purposes of illustration. However, they can be implemented in a variety of data structures or formats.

In one embodiment, analysis module 433 performs an analysis on at least metadata 124 of images 122 to extract or obtain various image features associated with images 122 and their metadata 124. Based on the analysis, a set of feature scoring formulas or algorithms are determined based on the features of the images such as those listed above. For each of the features, a scoring formula or algorithm may be generated. In addition, a matching quality scoring formula or algorithm is also determined. Alternatively, the features and/or features scores may be trained or learned by machine learning engine 435 to create a ranking model to determine a ranking score for a particular image. These algorithms and/or models can then be stored as part of image ranking algorithms/models 422, which can be utilized online to rank the image candidates to be matched with a content item in response to a search query. The image candidates may be identified using keyword/image mapping table 421 in response to a search query.

According to one embodiment, image mapping system 150, operating as a data analytics system, further includes user profile compiler 410 to compile user profiles 135 for a variety of users based on prior user interactions or user behaviors of the users under various circumstances. The user interactions of the users may be collected by data collection module 432. The user interactions of a user may be collected as part of user context received during online searching by server 104. The user interactions may include which content items, links, and/or Web sites a use has accessed. The user interactions may further record the circumstances under which the user has accessed those resources such as, date and time, day of a week or month, particular holiday, etc.

Based on the prior user interactions, user profile compiler 410 compiles a user profile for each identified user. A user profile may include identifying information of the corresponding user such as a device ID identifying a user device (e.g., an IP address, media access control or MAC address, international mobile subscriber identity or IMSI, a serial number). The user profile may further include user specific behaviors, habits, tendency of accessing resources, which may be determined by profile compiler 410 based on an analysis on the prior user interactions. User profiles 135 may then be uploaded to server 104 and periodically updated for online searching purposes, where user profiles 135 may be utilized for selecting content items and images at runtime.

Figure 5:
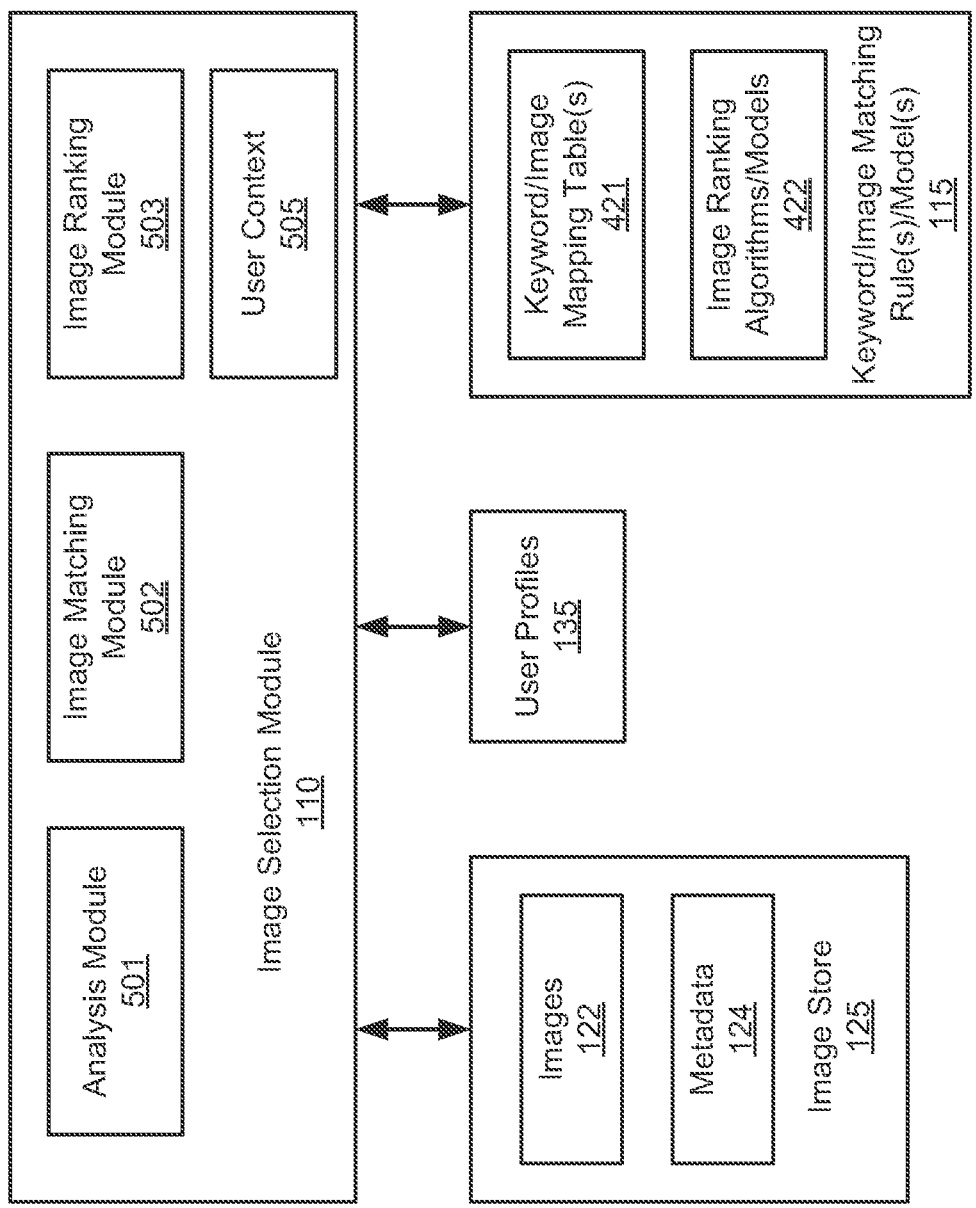
FIG. 5 is a block diagram illustrating an example of an image matching system according to one embodiment of the invention.

FIG. 5 is a block diagram illustrating an example of an image matching system according to one embodiment of the invention. System 500 may be implemented as part of system 200 of FIG. 2. Referring to FIG. 5, system 500 may be incorporated with system 200 of FIG. 2. Alternatively, system 500 may be implemented as a standalone system or a server communicatively coupled to system 200 of FIG. 2, for example, via an API or a communication protocol over a network or a connection. In one embodiment, system 500 is responsible for identifying, ranking, and selecting images to be matched with content items found in response to a search query at runtime, in response to a search query for searching content.

In one embodiment, image selection module 110 includes analysis module 501, image matching module 502, and image ranking module 503, where some or all of these modules may be implemented in software, hardware, or a combination thereof. In one embodiment, in response to a search query received from a client device for searching content, the search query is analyzed by analysis module 501 to determine one or more keywords. For a given content item to be matched with an image, analysis module 501 also analyzes the content and the associated content provider to generate additional keywords. Analysis module 501 may extract one or more keywords from the content item summarizing or describing the content item. Analysis module 501 may determine one or more keywords representing or describing the content provider (e.g., logo). Analysis module 501 may further perform a latent semantic analysis on the keywords to expand the keywords to include one or more keywords that are semantically related.

A search or lookup operation is performed by image matching module 502 in keyword/image mapping table 421 based on the keywords. The keyword/image mapping table 421 includes multiple entries and each entry maps an image ID identifying an image to one or more keywords, or vice versa (e.g., matching tables as shown in FIG. 3. For each of the images identified as image candidates, a ranking process is performed by image ranking module 503 to determine a ranking score for the image. The images may be ranked or sorted based on image ranking algorithms or models 422, which may be configured by system 400 of FIG. 4 as described above.

According to one embodiment, when searching and/or ranking images, user context 505 of a user captured at runtime and user profile 135 of the user are taken into consideration to select an image that is most appealing to the user. User context 505 may be implemented as part of user context 138. A user context refers to any user information related to a user who initiates a search query at the point in time, where the user information is captured at the time when the search query was issued. At least a portion of the user context may be captured and received from a user/client device that issued a search query. A user context may include a device ID of a user device (e.g., an IP address, a MAC address, an IMSI, a serial number), date and time when the search query was issued, a brand name of the use device, an operating system (OS) and version of the OS running within the user device, cookie information, browser information, a geographic location (e.g., longitude and latitude) of the user device at the point in time, specific activities performed by the user at the time, etc. The device ID may be utilized to search, identify, and update a user profile associated with the user.

A user profile refers to user information that has been compiled based on the user information or user interactions captured in the past period of time. A user profile may include an analysis result performed by an analysis module or a profile compiler based on the prior user information and user interactions. A user profile may include a user tendency under certain circumstances (e.g., browsing tendency), habits, a prediction of user actions in the future, a prediction of user's favors (e.g., favorite colors, shapes, images, content, links, brands). A user profile may further include identifying information uniquely identifying a user, such as, for example, a device ID of a user device (e.g., an IP address, a MAC address, an IMSI, a serial number), etc.

Figure 6:
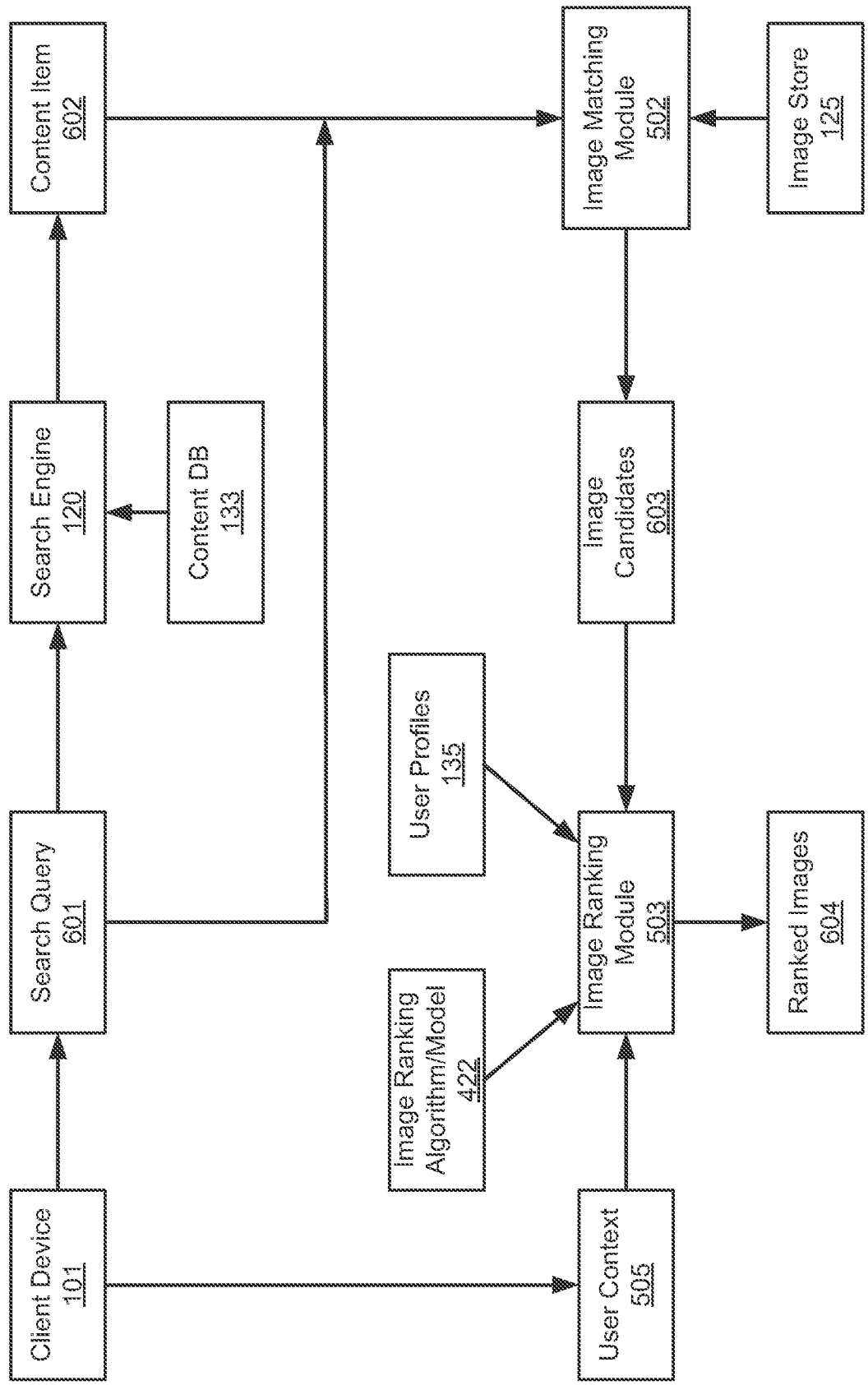
FIG. 6 is a processing flow of selecting images according to one embodiment of the invention.

FIG. 6 is a processing flow of selecting images according to one embodiment of the invention. Process 600 may be performed by system 500 of FIG. 5. Referring to FIGS. 5 and 6, when search query 601 is received from client device 101, search engine 120 performs a search in content database 133 to identify content item 602 (e.g., sponsored content such as Ad). Search engine 120 may compare one or more keywords of search query 601 against one or more predetermined keywords (e.g., bidwords) associated with content providers (e.g., advertisers). If a keyword associated with search query matches a predetermined keyword of a content provider, a content item provided by the content provider may be selected as content item 602 as an example.

In one embodiment, based on content item 602, search query 601, and/or a content provider that provides content item 602, image matching module 502 performs a search in image store or server 125. Image matching module 502 may obtain a list of keywords from search query 601, content item 602 (e.g., title, description, words based on image recognition), and/or keywords associated with the content provider (e.g., bidwords). The keywords may be expanded to include one or more semantically similar keywords, which may be determined based on an analysis on the keywords, such as, for example, a latent semantic analysis. The image search is performed based on the keywords to identify the list of images as image candidates 603.

In one embodiment, image ranking module 503 ranks and sorts image candidates 603 using ranking algorithm(s) or ranking model(s) 422, which may be determined and configured by image mapping system 150 operating as a data analytics system. In ranking image candidates 603, image ranking module 503 further takes user context 505 and user profile 135 into consideration. User context 505 may be captured by client device 101 and receives together with search query 601.

For example, a date is determined from user context 505 and an image having image content associated that date may be ranked higher. Similarly, if the date is a special day (e.g., Christmas, a New Year day, or nation's independent day), an image having image content or an attribute related to the special day may be ranked higher. For example, if the day of the user context is around the Christmas, an image having Christmas content or an image have a color theme of red may be ranked higher.

According to another embodiment, for each of the image candidates, an image feature is extracted. An image feature may be an edge feature (e.g., representing sharpness, contrast), a color feature, or a blob feature. Image ranking module 503 examines the extracted feature in view of user context 505 and user profile 135 to determine whether the image candidate having the extracted feature is suitable for the user. Any image having an image feature contradicts the user context 505 and user profile 135 may be removed from or ranked lower in the list. The rules to filter out the unrelated images may be trained and configured offline, for example, by image mapping system 150. The training may be performed on a large amount of user interactions of a variety of users.

For example, based on a geographic location of the user device, which may be determined based on user context 505, image ranking module 503 can determine whether the user is at a predetermined type of location (e.g., home, shopping mall). If it is determined that the user is at home, for example, an image with a lower or less edge feature may be ranked higher because a user tends to like more peaceful image at home. If it is determined that the use is at a shopping mall at the time of issuing the search query, an image showing on-sales or other promotions may be ranked higher. Alternatively, if a particular user may like certain colors, which may be determined based on user profile 135, an image having the same or similar color theme may be ranked higher. If it is determined the current day of the user context is a special day such as the Christmas, an image having a Holiday color theme may be ranked higher. Thereafter, a list of ranked images 604 is generated as a result and one of the top-ranked image candidates may be selected as a final image to be associated with content item 602.

Figure 7:
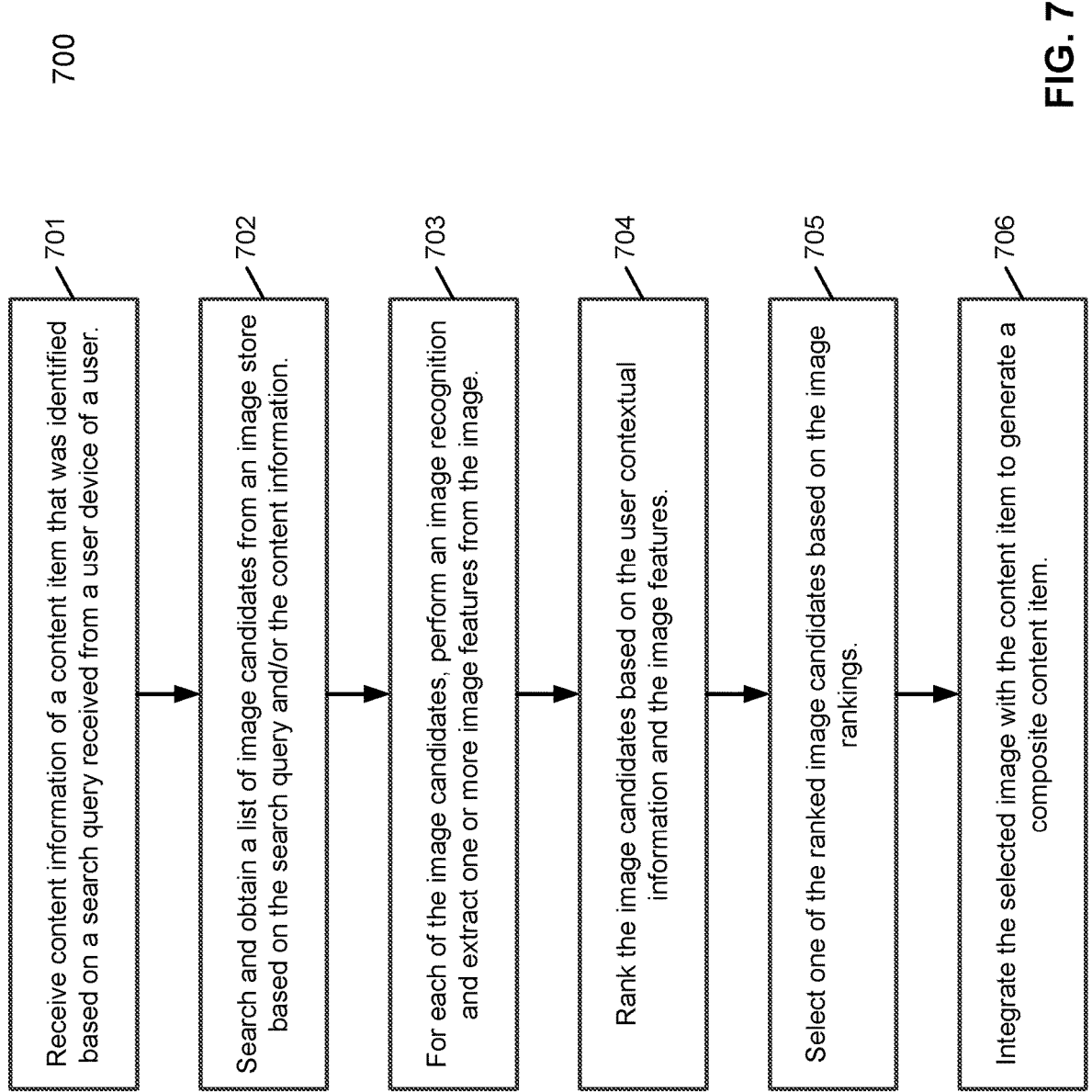
FIG. 7 is a flow diagram illustrating a process of ranking images based on user contextual information according to one embodiment of the invention.

FIG. 7 is a flow diagram illustrating a process of ranking images based on user contextual information according to one embodiment of the invention. Process 700 may be performed by processing logic which may include software, hardware, or a combination thereof. For example, process 700 may be performed by system 500 of FIG. 5. Referring to FIG. 7, at block 701, processing logic receives content information of a content item (e.g., sponsored content item) that was identified based on a search query receive from a user device of a user. At block 702, processing logic searches in an image store to identify a list of image candidates based on the search query and content information. The content information may include information extracted from the content item itself and content provider information (e.g., bidwords) of a content provider that provides the content item (e.g., advertiser). In one embodiment, the list of images may also be identified based on a user context and/or a user profile associated with the user. The user context may be received in real-time along with the search query from the user device.

For each of the image candidates, at block 703, one or more image features are extracted from the image. At block 704, the image candidates are ranked based on the user context and the associated image features using a predetermined image ranking algorithm or model. At block 705, one of the top-ranked image candidates is selected based on the image rankings. At block 706, the selected image is integrated with the content item to generate a composite content item. The composite item is then returned to the user device to be presented to the user.

Figure 8:
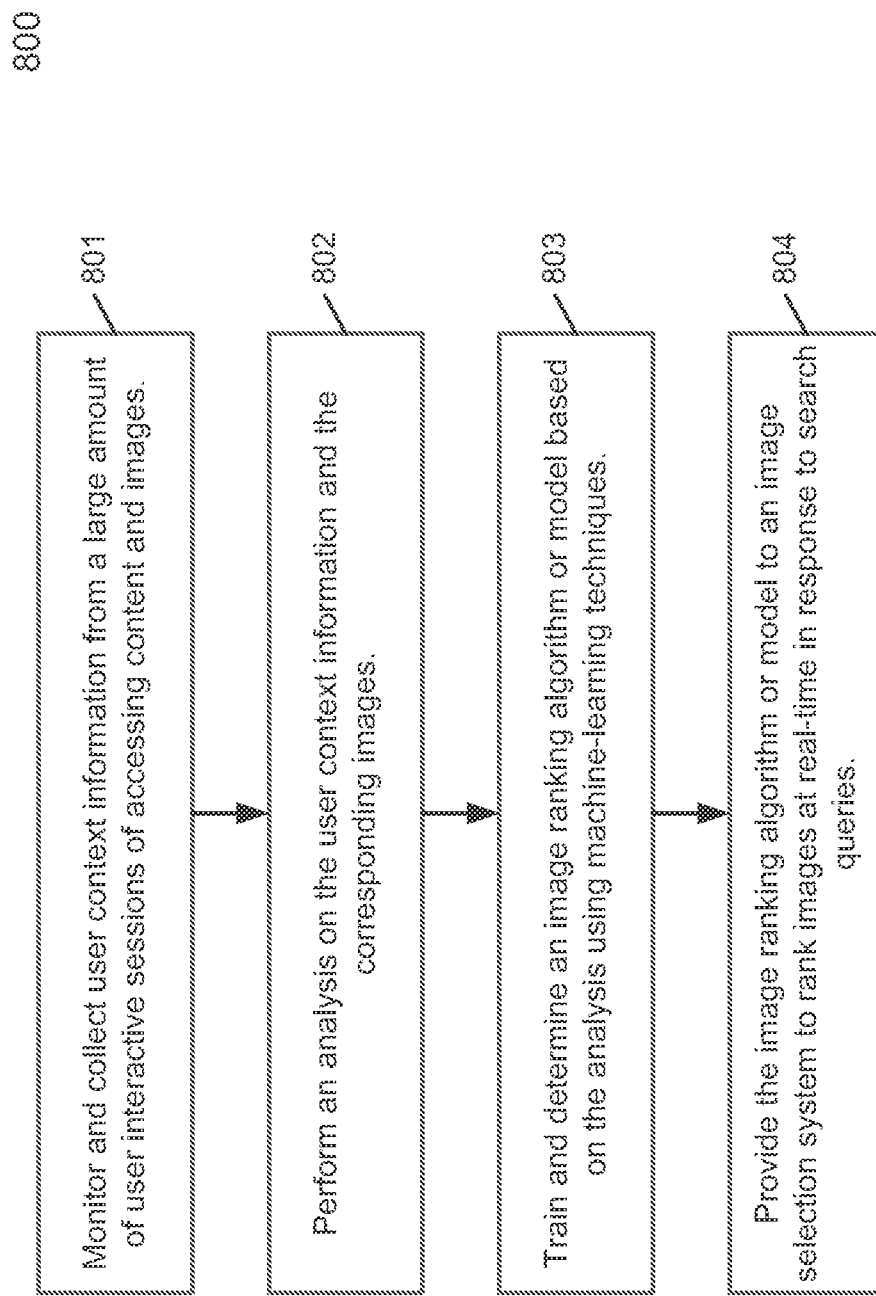
FIG. 8 is a flow diagram illustrating a process of determining image ranking algorithm according to one embodiment of the invention.

FIG. 8 is a flow diagram illustrating a process of determining image ranking algorithm according to one embodiment of the invention. Process 800 may be performed by processing logic which may include software, hardware, or a combination thereof. For example, process 800 may be performed by system 400 of FIG. 4. Referring to FIG. 8, at block 801, processing logic collects user contextual information from a large amount of user interactive sessions of accessing images. The user contextual information may be part of prior user contexts collected during a past period of time. At block 802, processing logic performs an analysis on the user contextual information and the corresponding images. At block 803, processing logic determines or trains an image ranking algorithm or model based on the analysis. At block 804, the image ranking algorithm or model is provided to an image selection system to rank images at real-time in response to search queries.

The techniques described above can be applied to matching images with sponsored content. One type of the sponsored content is advertisement (Ad). For example, referring back to FIGS. 1A-1B, content database (DB) or server 133 may be an Ad database or part of an Ad system or server. Each of the content items, e.g., Ads, is associated with a list of predefined keywords, terms, phrases, or sentences. These predefined keywords, terms, phrases, or sentences may be bidwords purchased, defined or specified by an advertiser. In another embodiment, primary content DB 130 may store the general content generally available in a public network. Auxiliary content DB 131 may be an Ad DB, while image selection module/system 110 may be an Ad system communicatively coupled to search engine 120. In response to a search query, search engine 120 searches primary content DB 130 to identify a list of general content items (e.g., URLs). Search engine 120 then communicate with the Ad system to identify and retrieve one or more Ads with matching images as described above. The general content items and the Ads with matching images are then returned by search engine 120 to a client as part of a search result. Some of the Ads may be just plain texts. By matching and integrating an image with the Ads, for example, as a background image, the Ads may be more appealing or attractive to users. Server 104 may be a Web server for searching content or alternatively, server 104 may be an Ad server.

Figure 9:
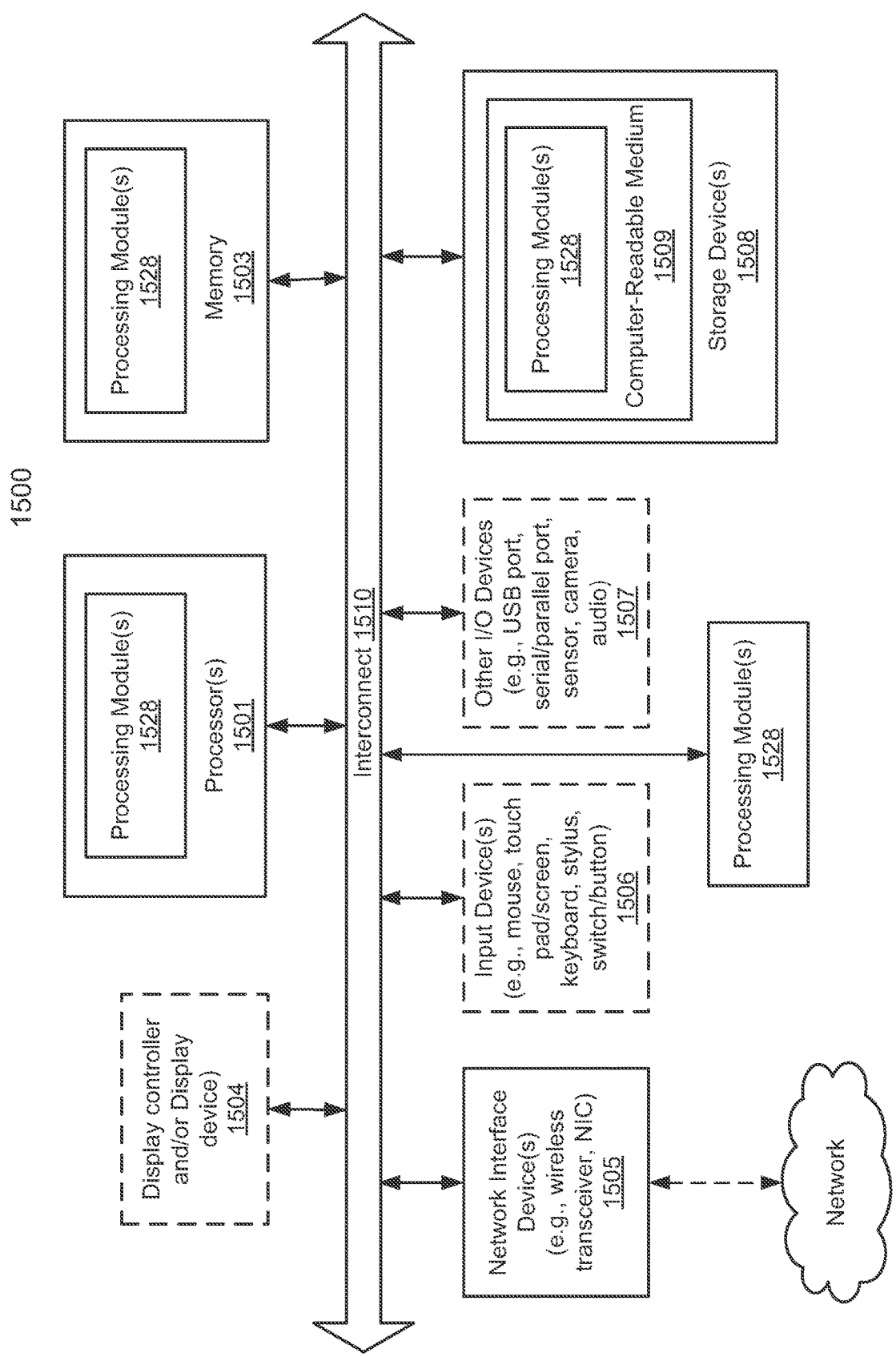
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, any of clients 101-102, server 104, content server 133, or image mapping system/server 150, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, a search engine, an image selection module/system as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store at least some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for searching and selecting images, the method comprising:
   receiving a content item that was searched and identified based on a first set of one or more keywords determined based on a search query received from a client device over a network;
   searching in an image store to identify a plurality of images based on the first set of keywords and a second set of one or more keywords associated with the content item;
   ranking the plurality of images based on a user context obtained at a time when the search query was received, including determining that a user of the client device is at a predetermined type of location based on a geographic location that was determined based on the user context; and, in response to the predetermined type of location, increasing a ranking of an image with a lower or less edge feature;
   generating a composite content item by incorporating an image selected from the ranked images with the content item, wherein the selected image is ranked above a predetermined threshold; and
   transmitting the composite content item to the client device over the network.

2. The method of claim 1, wherein the user context was received along with the search query from the client device.

3. The method of claim 2, wherein the user context includes a date and time when the search query was received.

4. The method of claim 3, further comprising:
   determining based on the user context that the date when the search query was received matches a predetermined day; and
   selecting the image having a color feature matching the predetermined day.

5. The method of claim 1, wherein ranking the plurality of images based on a user context comprises:
   for each of the plurality of images, extracting one or more image features from the image;
   determining whether the extracted image features are suitable for presentation based on the user context; and
   removing the image from consideration if the extracted image features contradicts user contextual information provided by the user context.

6. The method of claim 5, further comprising performing an image recognition on the image to determine image content represented by the image, wherein an image having image content related to the circumstances represented by the user context is ranked higher.

7. The method of claim 5, wherein the image features include one or more of an edge feature, a color feature, or a blob feature.

8. A non-transitory machine-readable medium having instructions stored therein, which when executed by a processor, cause the processor to perform operations of searching and selecting images, the operations comprising:
   receiving a content item that was searched and identified based on a first set of one or more keywords determined based on a search query received from a client device over a network;
   searching in an image store to identify a plurality of images based on the first set of keywords and a second set of one or more keywords associated with the content item;
   ranking the plurality of images based on a user context obtained at a time when the search query was received, including determining that a user of the client device is at a predetermined type of location based on a geographic location that was determined based on the user context; and, in response to the predetermined type of location, increasing a ranking of an image with a lower or less edge feature;
   generating a composite content item by incorporating an image selected from the ranked images with the content item, wherein the selected image is ranked above a predetermined threshold; and
   transmitting the composite content item to the client device over the network.

9. The machine-readable medium of claim 8, wherein the user context was received along with the search query from the client device.

10. The machine-readable medium of claim 9, wherein the user context includes a date and time when the search query was received.

11. The machine-readable medium of claim 10, wherein the operations further comprise:
   determining based on the user context that the date when the search query was received matches a predetermined day; and
   selecting the image having a color feature matching the predetermined day.

12. The machine-readable medium of claim 8, wherein ranking the plurality of images based on a user context comprises:
- for each of the plurality of images, extracting one or more image features from the image;
- determining whether the extracted image features are suitable for presentation based on the user context; and
- removing the image from consideration if the extracted image features contradicts user contextual information provided by the user context.

13. The machine-readable medium of claim 12, wherein the operations further comprise performing an image recognition on the image to determine image content represented by the image, wherein an image having image content related to the circumstances represented by the user context is ranked higher.

14. The machine-readable medium of claim 12, wherein the image features include one or more of an edge feature, a color feature, or a blob feature.

15. A data processing system, comprising:
- a processor; and
- a memory coupled to the processor to store instructions, which when executed by the processor, cause the processor to perform operations of searching and selecting images, the operations including
  - receiving a content item that was searched and identified based on a first set of one or more keywords determined based on a search query received from a client device over a network,
  - searching in an image store to identify a plurality of images based on the first set of keywords and a second set of one or more keywords associated with the content item,
  - ranking the plurality of images based on a user context obtained at a time when the search query was received, including determining that a user of the client device is at a predetermined type of location based on a geographic location that was determined based on the user context; and, in response to the predetermined type of location, increasing a ranking of an image with a lower or less edge feature,
  - generating a composite content item by incorporating an image selected from the ranked images with the content item, wherein the selected image is ranked above a predetermined threshold, and
  - transmitting the composite content item to the client device over the network.

16. The system of claim 15, wherein the user context was received along with the search query from the client device.

17. The system of claim 16, wherein the user context includes a date and time when the search query was received.

18. The system of claim 17, wherein the operations further comprise:
- determining based on the user context that the date when the search query was received matches a predetermined day; and
- selecting the image having a color feature matching the predetermined day.

19. The system of claim 15, wherein ranking the plurality of images based on a user context comprises:
- for each of the plurality of images, extracting one or more image features from the image;
- determining whether the extracted image features are suitable for presentation based on the user context; and
- removing the image from consideration if the extracted image features contradicts user contextual information provided by the user context.

20. The system of claim 19, wherein the operations further comprise performing an image recognition on the image to determine image content represented by the image, wherein an image having image content related to the circumstances represented by the user context is ranked higher.

21. The system of claim 19, wherein the image features include one or more of an edge feature, a color feature, or a blob feature.

* * * * *